(12) United States Patent
Sumiuchi

(10) Patent No.: US 10,958,477 B2
(45) Date of Patent: Mar. 23, 2021

(54) INFORMATION PROCESSING APPARATUS, METHOD FOR CONTROLLING THE SAME, AND COMPUTER-READABLE MEDIUM

(71) Applicant: CANON KABUSHIKI KAISHA, Tokyo (JP)

(72) Inventor: Kazuyoshi Sumiuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 16/005,260

(22) Filed: Jun. 11, 2018

(65) Prior Publication Data

US 2018/0294992 A1 Oct. 11, 2018

Related U.S. Application Data

(63) Continuation of application No. 15/193,679, filed on Jun. 27, 2016, now Pat. No. 10,003,472.

(30) Foreign Application Priority Data

Jun. 30, 2015 (JP) ................................ 2015-132164

(51) Int. Cl.
*H04M 3/00* (2006.01)
*H04L 12/46* (2006.01)
(Continued)

(52) U.S. Cl.
CPC ...... *H04L 12/4604* (2013.01); *H04M 1/7253* (2013.01); *H04W 12/06* (2013.01);
(Continued)

(58) Field of Classification Search
CPC ..... H04W 36/03; H04W 76/34; H04W 76/15; H04W 84/12; H04W 8/005; G06F 3/1226; G06F 3/1229
See application file for complete search history.

(56) References Cited

U.S. PATENT DOCUMENTS

2006/0002352 A1 1/2006 Nakamura
2012/0316963 A1* 12/2012 Moshfeghi ........... G06Q 20/327
705/14.58
(Continued)

FOREIGN PATENT DOCUMENTS

CN 1378405 A 11/2002
CN 102347974 A 2/2012
(Continued)

*Primary Examiner* — Barry W Taylor
(74) *Attorney, Agent, or Firm* — Canon U.S.A., Inc. IP Division

(57) ABSTRACT

An information processing apparatus that communicates with a communication apparatus includes a connecting unit that connects to a first access point in the communication apparatus, a connection-information acquisition unit that acquires connection information for connecting to a second access point in the communication apparatus via the first access point, a storage unit that stores the acquired connection information in a memory, and a receiving unit that receives an instruction to transmit data. Upon receipt of an instruction to transmit data when the connecting unit is not connected to the second access point, the connecting unit connects to the second access point using the stored connection information stored in the storage unit, and when the connecting unit is connected to the second access point, the first access point is disabled.

42 Claims, 10 Drawing Sheets

(51) Int. Cl.
  *H04W 12/06*   (2021.01)
  *H04M 1/725*   (2021.01)
  *H04W 76/11*   (2018.01)
  *H04W 36/00*   (2009.01)
  *H04W 88/08*   (2009.01)
  *H04W 84/12*   (2009.01)
  *H04W 76/34*   (2018.01)
  *H04W 76/15*   (2018.01)
  *H04W 12/00*   (2021.01)
  *H04W 8/00*    (2009.01)
  *G06F 3/12*    (2006.01)

(52) U.S. Cl.
  CPC .......... *H04W 36/00* (2013.01); *H04W 36/03* (2018.08); *H04W 76/11* (2018.02); *G06F 3/1226* (2013.01); *G06F 3/1229* (2013.01); *H04M 2250/02* (2013.01); *H04M 2250/06* (2013.01); *H04W 8/005* (2013.01); *H04W 12/00516* (2019.01); *H04W 76/15* (2018.02); *H04W 76/34* (2018.02); *H04W 84/12* (2013.01); *H04W 88/08* (2013.01)

(56) References Cited

U.S. PATENT DOCUMENTS

2016/0345254 A1\* 11/2016 Iwami ................... H04W 48/18
2019/0239259 A1\* 8/2019 Kunimatsu ........... G06F 3/1221

FOREIGN PATENT DOCUMENTS

| CN | 102651903 A | 8/2012 |
| CN | 104039016 A | 9/2014 |
| JP | 2005-210328 A | 8/2005 |
| JP | 2012-029148 A | 2/2012 |
| JP | 2012-100171 A | 5/2012 |
| JP | 2014-175892 A | 9/2014 |

\* cited by examiner

INFORMATION PROCESSING APPARATUS, METHOD FOR CONTROLLING THE SAME, AND COMPUTER-READABLE MEDIUM

CROSS REFERENCE TO RELATED APPLICATIONS

The present application is a continuation of U.S. patent application Ser. No. 15/193,679, filed on Jun. 27, 2016, which claims priority from Japanese Patent Application No. 2015-132164, filed Jun. 30, 2015, which is hereby incorporated by reference herein in its entirety.

BACKGROUND

Field

Aspects of the present invention generally relate to an information processing apparatus that communicates with a communication apparatus, a method for controlling the same, and a computer-readable medium.

Description of the Related Art

There is a known communication system in which an information processing apparatus, such as a smartphone, connects to a communication apparatus, such as a printer, to perform data communication. One example of a method for connecting an information processing apparatus to a communication apparatus is a method of directly connecting to the communication apparatus not via an external access point (a wireless LAN router) connected to the Internet. The method allows an information processing apparatus to communicate with a communication apparatus even under an environment in which no external access point is present around the information processing apparatus and an environment in which no external access point is available.

However, when an information processing apparatus and a communication apparatus are connected together not via an external access point, the information processing apparatus cannot sometimes use the Internet.

Japanese Patent Laid-Open No. 2014-207650 discloses a mobile communication terminal that starts to connect to a digital camera when starting data communication with the digital camera and releases the connection to the digital camera when terminating the data communication with the digital camera.

The technique disclosed in Japanese Patent Laid-Open No. 2014-207650 needs to perform a connection setting process in advance for establishing connection to a destination communication apparatus to automatically switching destinations. However, the connection setting process generally involves troublesome operations for the user, such as acquiring connection information for connecting to the communication apparatus and inputting a predetermined password. The technique disclosed in Japanese Patent Laid-Open No. 2014-207650 does not consider user convenience in the connection setting process. Thus, the technique disclosed in Japanese Patent Laid-Open No. 2014-207650 has a problem in that the connection setting process involves troublesome operations for the user.

SUMMARY

Aspects of the present invention provide an information processing apparatus that starts connection to a communication apparatus without troublesome operations for the user, a method for controlling the same, and a computer readable medium.

An information processing apparatus configured to communicate with a communication apparatus includes a connecting unit, a connection-information acquisition unit, a storage unit, and a receiving unit. The connecting unit is configured to connect to a first access point in the communication apparatus without receiving input of connection information. The connection-information acquisition unit is configured to acquire connection information for connecting to a second access point in the communication apparatus via the first access point connected to the connecting unit. The storage unit is configured to store the connection information acquired by the connection-information acquisition unit in a memory. The receiving unit is configured to receive an instruction to transmit data. When the receiving unit receives an instruction to transmit data in a state where the connecting unit is not connected to the second access point, the connecting unit connects to the second access point using the connection information stored in the storage unit. When the connecting unit is connected to the second access point, the first access point is disabled.

Further features of aspects of the present invention will become apparent from the following description of exemplary embodiments with reference to the attached drawings.

DESCRIPTION OF THE EMBODIMENTS

Embodiments of the present invention will be described hereinbelow by way of illustration with reference to the drawings. It to be understood that by those skilled in the art that aspects of the present invention can be changed or modified without departing from the spirit and scope of aspects of the present invention.

First Embodiment

An information processing apparatus according to a first embodiment of the present invention will be described. Although this embodiment illustrates a smartphone as an example of the information processing apparatus, this is given for mere illustration, and any other information processing apparatuses, such as a mobile terminal, a notebook computer, a tablet terminal, a personal digital assistant (PDA), and a digital camera, can be used. Although this embodiment illustrates a printer as an example of the communication apparatus, this is given for mere illustration, and any other communication apparatuses that can communicate with the information processing apparatus can be used. Examples of the printer include an ink-jet printer, a color laser printer, and a monochrome printer. Aspects of the invention can also be applied to copying machines, facsimile machines, mobile terminals, smartphones, notebook computers, PDAs, digital cameras, and the like. Aspects of the invention can also be applied to multifunctional peripherals having a copying function, a facsimile function, and a printing function.

Figure 2:
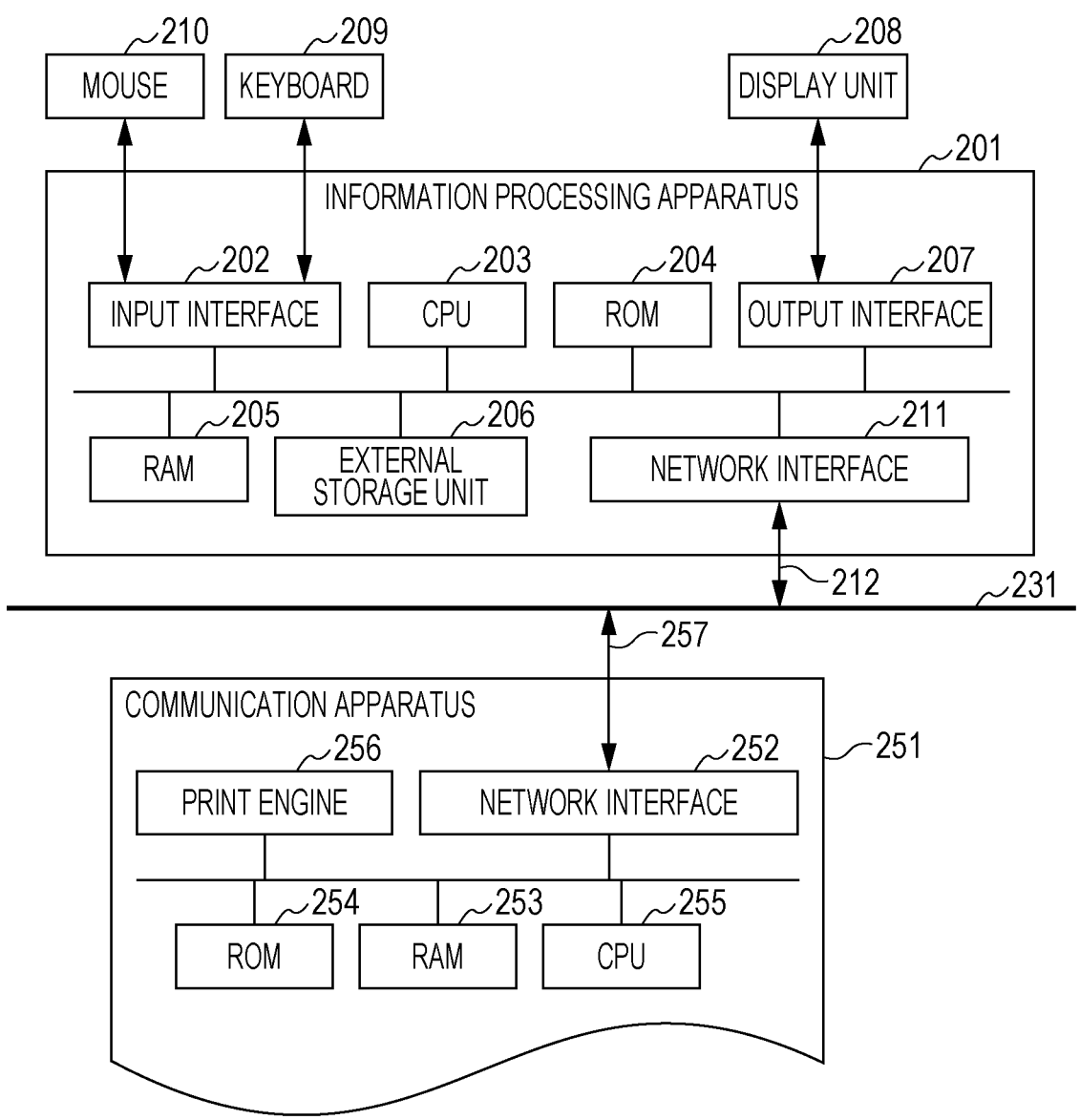
FIG. 2 is a diagram illustrating the configuration of an information processing apparatus and a communication apparatus according to an embodiment of the present invention.

First, the configuration of the information processing apparatus according to this embodiment and the configuration of a communication apparatus that can communicate with the information processing apparatus of this embodiment will be described with reference to a block diagram of FIG. 2. While this embodiment will be described using the following configuration as an example, this embodiment is applicable to apparatuses capable of communicating with communication apparatuses and is not limited to the drawing.

An information processing apparatus 201 is the information processing apparatus of this embodiment. The information processing apparatus 201 includes an input interface 202, a CPU 203, a ROM 204, a RAM 205, an external storage unit 206, an output interface 207, a display unit 208, and a network interface 211. The information processing apparatus 201 further includes a communication unit (not shown) for connecting to the Internet via a mobile communication network, such as 3G and Long-Term Evolution (LTE).

The input interface 202 is an interface for receiving data input and operation instructions from the user using a mouse 210 or a keyboard 209.

The CPU 203 is a system control unit, which controls the whole of the information processing apparatus 201.

The ROM 204 stores fixed data, such as control programs that the CPU 203 executes, data tables, and embedded operating system (hereinafter referred to as "OS") programs. In this embodiment, the control programs stored in the ROM 204 control software implementation, such as scheduling, task switching, and interrupt processing, under the control of the embedded OS stored in the ROM 204.

One example of the RAM 205 is a static random access memory (SRAM) that needs a backup power source. The RAM 205 can store important data, such as program control variables, without volatilizing them because the RAM 205 uses a data backup primary cell. The RAM 205 further has a memory area for storing setting information regarding the information processing apparatus 201, management data regarding the information processing apparatus 201, and the like. The RAM 205 is used also as a main memory and a work memory of the CPU 203.

The external storage unit 206 stores an application for providing a print executing function, a print-information generation program for generating print information that can be interpreted by a communication apparatus 251. The external storage unit 206 also stores various programs, such as a program for controlling transmission and reception of information transmitted to and received from the communication apparatus 251 via the network interface 211, and various pieces of information that these programs use.

The output interface 207 is an interface for controlling display of data and notification of the status of the information processing apparatus 201 on the display unit 208.

Examples of the display unit 208 include a light-emitting diode (LED) and a liquid crystal display (LCD), on which data and the status of the information processing apparatus 201 are displayed. Furthermore, operating devices, such as a numeral input key, a mode setting key, a determination key, a cancel key, and a power key, may be disposed on the display unit 208 to receive input from the user.

The network interface 211 has a configuration for connecting the information processing apparatus to an external device, such as the communication apparatus 251. For example, the network interface 211 can connect to an access point (not shown) in the communication apparatus 251. Connecting the network interface 211 to the access point in the communication apparatus 251 enables the information processing apparatus 201 and the communication apparatus 251 to communicate with each other. The communication may be established directly via a wireless communication or via an external access point on a wired network. Examples of a communication system include Wireless Fidelity (Wi-Fi®), Bluetooth®, and Near Field Communication (NFC, ISO/IEC IS 18092).

The communication apparatus 251 includes a network interface 252, a RAM 253, a ROM 254, a CPU 255, and a print engine 256. The network interface 252 has, as the access point in the communication apparatus 251, an access point for connecting to an external device, such as the information processing apparatus 201. The access point can connect to the network interface 211 of the information processing apparatus 201. The communication may be established directly via a wireless communication or via an external access point on a wired network. Examples of a communication system include Wi-Fi®, Bluetooth®, and NFC. The network interface 252 may include hardware that serves as an access point or may operate as the access point using software for causing the network interface 252 to serve as an access point. This embodiment includes two access points in the communication apparatus 251: an access point that is enabled when a connection setting mode is set and an access point that is enabled when a direct communication mode is set.

One example of the RAM 253 is a SRAM that needs a backup power source. The RAM 253 can store important data, such as program control variables, without volatilizing them because the RAM 253 uses a data backup primary cell. The RAM 253 further has a memory area for storing setting information regarding the communication apparatus 251, management data regarding the communication apparatus 251, and the like. The RAM 253 is used also as a main memory and a work memory of the CPU 255 and stores a reception buffer for temporarily storing print information received from the information processing apparatus 201 and various pieces of information.

The ROM 254 stores fixed data, such as control programs that the CPU 255 executes, data tables, and OS programs. In this embodiment, the control programs stored in the ROM 254 control software implementation, such as scheduling, task switching, and interrupt processing, under the control of the embedded OS stored in the ROM 254.

The CPU 255 is a system control unit, which controls the whole of the communication apparatus 251.

The print engine 256 forms images on a printing medium, such as paper, using a printing material, such as ink, on the basis of information stored in the RAM 253 or a print job received from the information processing apparatus 201 or the like to output the result of printing.

The information processing apparatus 201 may be loaded with a memory as an optional device, such as an external HDD and a secure digital (SD) card, so that information to be stored in the information processing apparatus 201 can be stored in the memory.

Although this embodiment assigns the tasks of the information processing apparatus 201 and the communication apparatus 251 as described above, this is not intended to limit aspects of the invention, and any other assignments may be adopted.

Figure 1A:
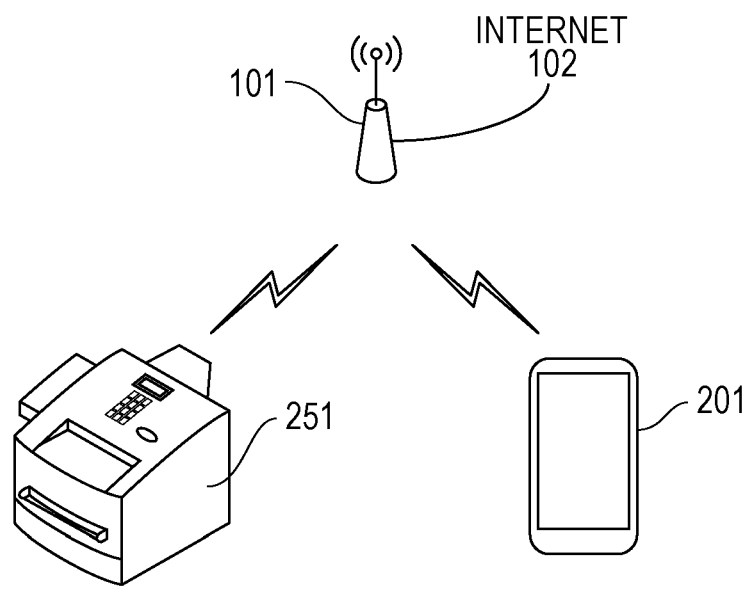
FIG. 1A is a diagram illustrating a communication mode of a communication apparatus according to an embodiment of the present invention.
Figure 1B:
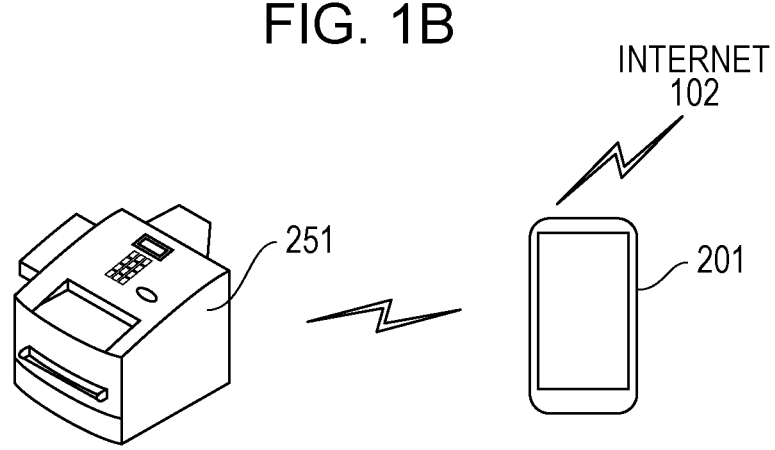
FIG. 1B is a diagram illustrating a communication mode of a communication apparatus according to an embodiment of the present invention.

Examples of a communication mode set for the communication apparatus 251 will be described with reference to FIGS. 1A and 1B.

The communication mode is a mode for the communication apparatus 251 to communicate with an external apparatus and is set on the communication apparatus 251. In this embodiment, the communication apparatus 251 is capable of communication using a connection configuration called an infrastructure connection (hereinafter referred to as "infra connection") or a direct connection, for which a communication mode according to the connection configuration is set. Hereinafter, a communication mode for establishing communication using the infra connection is referred to as an infra communication mode, and a communication mode for establishing communication using the direct connection is referred to as a direct communication mode. In this embodiment, the communication apparatus 251 receives a command for setting a communication mode from the information processing apparatus 201 to thereby set the communication mode according to the command. The communication modes that can be set on the communication apparatus 251 are given for mere illustration. The communication apparatus 251 may be configured to use at least a communication mode for establishing communication using a connection configuration in which connection to the Internet cannot be established (the direct communication mode in this embodiment).

First, the infra communication mode will be described with reference to FIG. 1A. The infra communication mode is a communication mode for the communication apparatus 251 and an external apparatus to connect together via an access point in the communication apparatus 251 and an access point outside the external apparatus. In this embodiment, the communication apparatus 251 in the infra communication mode communicates with the information processing apparatus 201 via a router 101 serving as an external access point. The router 101 is capable of connecting to the Internet 102, allowing the information processing apparatus 201 and the communication apparatus 251 to connect to the Internet 102 that have communication via the router 101. In this embodiment, an access point outside the information processing apparatus 201 and the communication apparatus 251 and capable of connecting to the Internet, like the router 101, is referred to as an external access point.

Next, the direct communication mode will be described with reference to FIG. 1B. The direct communication mode is a communication mode for the communication apparatus 251 and an external apparatus to communicate with each other using direct connection. In this embodiment, the direct connection has a configuration in which the information processing apparatus 201 and an access point in the communication apparatus 251 connect together in peer-to-peer fashion. This is given for mere illustration, and any other configurations in which the information processing apparatus 201 and the communication apparatus 251 connect together in peer-to-peer fashion may be used in aspects of the invention. That is, the information processing apparatus 201 may connect to the communication apparatus 251 in peer-to-peer fashion by, for example, a WLAN connection using an ad hoc mode and a connection using Bluetooth®, not via the access point in the communication apparatus 251. The information processing apparatus 201 may use a communication standard, Wi-Fi Direct®. Since the communication apparatus 251 in which the direct communication mode is set is capable of communicating with the information processing apparatus 201 not via an external access point, the communication apparatus 251 can operate so as to communicate with the information processing apparatus 201 even without a connectable external access point.

In contrast, the communication apparatus 251 in which the direct communication mode is set and which is not equipped for WAN, such as an external wireless LAN router, is not capable of connecting to the Internet. The information processing apparatus 201, when capable of direct connection to the communication apparatus 251, performs communication using the direct connection in priority to a communication via a mobile communication network. The information processing apparatus 201 in the direct connection mode cannot connect to the Internet. For this reason, when the information processing apparatus 201 shifts from a state where it connects to the Internet via a mobile communication network to the direct connection status, the connection between the information processing apparatus 201 and the Internet may be interrupted.

In this embodiment, an example of an information processing apparatus configured to prevent connection to the Internet from being continuously interrupted will be described. To this end, the information processing apparatus releases direct connection when communication with a communication apparatus using direct connection ends and reconnects to the Internet. Furthermore, in this embodiment, an example of an information processing apparatus configured to maintain connection to the Internet as long as possible will be described. To this end, the information processing apparatus starts direct connection when a need for communication with the communication apparatus arises. Furthermore, in this embodiment, an example of an information processing apparatus configured to omit troublesome connection setting for starting direct connection will be described. To this end, the information processing apparatus acquires connection information from a communication apparatus and stores the connection information when the communication mode of the communication apparatus is set and uses the connection information every time direct connection is established.

Next, a method for setting a communication mode on the communication apparatus 251 will be described. In setting a communication mode on the communication apparatus 251, a connection setting mode is used. The connection setting mode is a mode for setting one of the above communication modes on the communication apparatus 251 and is set on the communication apparatus 251. In this embodiment, the communication apparatus 251 in which the connection setting mode is set sets the infra communication mode or the direct communication mode on the communication apparatus 251 itself according to an instruction from the information processing apparatus 201. The connection setting mode is set on the communication apparatus 251 by the user performing an operation or input for setting a communication mode on the communication apparatus 251.

The communication apparatus 251 enables an access point having a service set identifier (SSID, hereinafter referred to as "communication apparatus SSID") generated according to a predetermined rule (hereinafter referred to as "generation rule") in response to the setting of the connection setting mode. The SSID is the identification name of the access point. The communication apparatus SSID is an SSID that is enabled only when the communication apparatus 251 is in the connection setting mode and is distinguished from the SSID of an external access point, such as a wireless LAN router, because it is generated under a generation rule. When the access point is enabled as the connection setting mode is set, the communication apparatus 251 broadcasts, as a beacon packet, connection information for connecting to the access point (communication apparatus SSID, cipher settings, and so on) to the surroundings. By detecting the access point of the communication apparatus 251 by receiving the packet, an apparatus that desires to connect to the communication apparatus 251 can connect to the communication apparatus 251 via the access point. For example, the information processing apparatus 201 acquires the communication apparatus SSID and sets the communication apparatus SSID as a destination SSID indicating the destination of the information processing apparatus 201. Thus, the information processing apparatus 201 connects to the communication apparatus 251 set in the connection setting mode via the access point of the communication apparatus 251. The access point corresponding to the communication apparatus SSID is used only in setting a communication mode, and is therefore at a security level lower that of an access point corresponding to a direct connection SSID, described later. This allows an apparatus that desires to connect to the communication apparatus 251 to connect to an access point corresponding to the communication apparatus SSID without using connection information, such as a password, (without an operation, such as inputting a password).

Next, a method for setting a communication mode on the communication apparatus 251 performed by the information processing apparatus 201 connected to the communication apparatus 251 in which the connection setting mode is set will be described.

The information processing apparatus 201 sets a communication mode on the communication apparatus 251 when a predetermined application installed in the information processing apparatus 201 and stored in the ROM 204 or a hard disk drive (HDD, not shown) of the information processing apparatus 201 is active. The predetermined application is an application for setting a communication mode on the communication apparatus 251 and for causing the communication apparatus 251 to print image data in the information processing apparatus 201 or content on the Internet, which is hereinafter referred to as a printing application. The printing application may have other functions in addition to the function of setting a communication mode on the communication apparatus 251 and the print function. For example, the printing application may have the function of scanning a document placed in the communication apparatus 251 having a scanning function, a function for performing another setting on the communication apparatus 251, and a function for checking the state of the communication apparatus 251.

Figure 3:
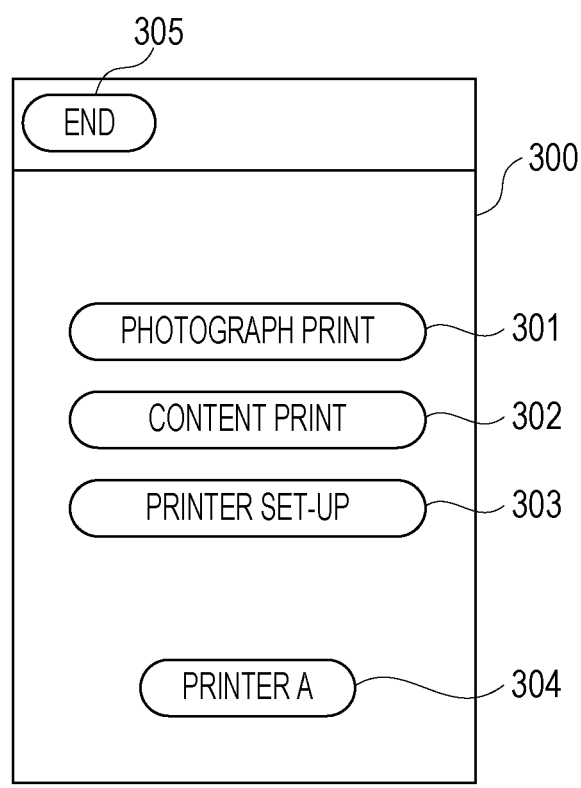
FIG. 3 is a diagram of an example screen when an application is stared according to an embodiment of the present invention.

FIG. 3 illustrates an example of a screen displayed on the display unit 208 when the printing application is started. The user can use the functions of the communication apparatus 251, such as printing a desired image and setting the communication apparatus 251, via a startup screen 300. Upon detecting a press of a printer set-up button 303, the information processing apparatus 201 displays a communication-mode setting screen 400 shown in FIG. 4 on the display unit 208. The user can set a communication mode on the communication apparatus 251 by doing input on the communication-mode setting screen.

Figure 4:
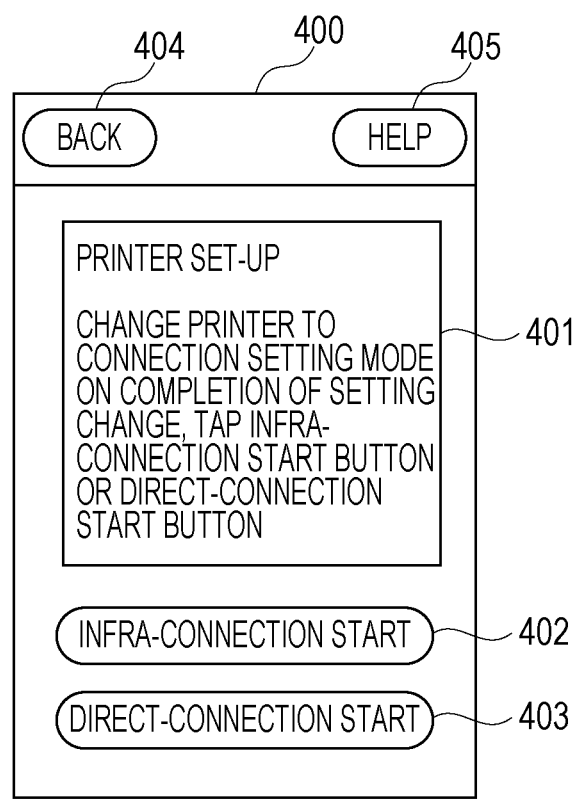
FIG. 4 is a diagram of an example of a communication-mode setting screen according to an embodiment of the present invention.

FIG. 4 illustrates an example a screen for setting a communication mode, which is displayed on the display unit 208 using the printing application. When the printer set-up button 303 shown in FIG. 3 is pressed, the setting screen 400 is displayed on the display unit 208. A notification area 401 displays a message for prompting the user to set the communication apparatus 251 in the connection setting mode. The messaging to the user may be performed by the communication apparatus 251. For example, when the communication apparatus 251 is started for the first time, the communication apparatus 251 may display a message on a display unit or the like of the communication apparatus 251.

When the user who checks the notification area 401 sets the communication apparatus 251 in the connection setting mode, the communication apparatus 251 enters a state where it can connect to an external apparatus using the communication apparatus SSID. The communication apparatus 251 may have a configuration in which the connection setting mode is set without a user operation. For example, the communication apparatus 251 may be configured to be automatically set to the connection setting mode when started for the first time. This configuration allows the operation of setting the connection setting mode to be omitted at the set-up of the communication apparatus 251, improving the user convenience. As described above, when the connection setting mode is set, the communication apparatus 251 generates a communication apparatus SSID. The communication apparatus SSID may be generated when the connection setting mode is set on the communication apparatus 251 or may be read from a generated SSID stored in a memory when the connection setting mode is set on the communication apparatus 251.

In the setting screen 400, an infra-connection start button 402 is a button for setting the infra communication mode on the communication apparatus 251. A direct-connection start button 403 is a button for setting the direct communication mode on the communication apparatus 251. When one of the buttons 402 and 403 is pressed, the information processing apparatus 201 executes an operation for setting a communication mode corresponding to the pressed button on the communication apparatus 251. A back button 404 is a button for terminating a process for the application. A HELP button 405 is a button for displaying a screen that indicates information for assisting the user, such as applications and a method for operating the communication apparatus 251.

This configuration allows the user to set a desired communication mode on the communication apparatus 251 by operating the information processing apparatus 201. A method for setting a communication mode is not limited to the above method. For example, the information processing apparatus 201 may automatically determine a communication mode according to the communication environment of the communication apparatus 251 and the information processing apparatus 201 without receiving a user operation.

Figure 7:
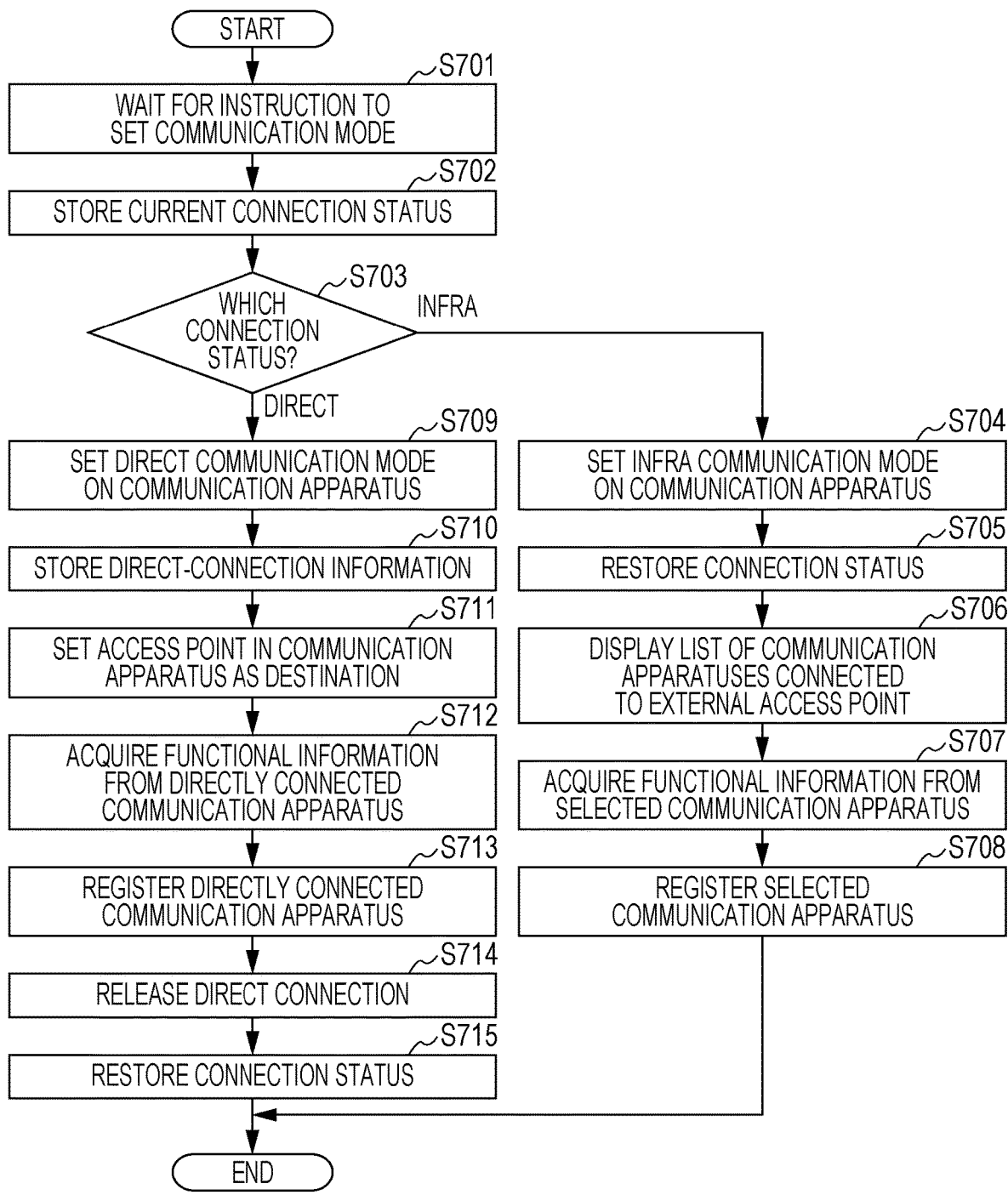
FIG. 7 is a flowchart illustrating a process that the information processing apparatus executes when setting a communication mode according to an embodiment of the present invention.

FIG. 7 is a flowchart illustrating a process that the information processing apparatus 201 executes when setting a communication mode in this embodiment. The process shown in the flowchart is implemented by the CPU 203 loading a control program stored in the ROM 204 or the HDD (not shown) of the information processing apparatus 201 into the RAM 205 and executing the control program. The process shown in the flowchart is started in a state where the setting screen 400 is displayed on the display unit 208. When the flowchart shown in FIG. 7 is started, the communication apparatus 251 is in the connection setting mode.

First, at S701, the CPU 203 waits for an instruction to set a communication mode. Specifically, the CPU 203 waits for the infra-connection start button 402 or the direct-connection start button 403 to be pressed. As described above, the communication mode set on the communication apparatus 251 is determined according to which of the buttons 402 and 403 is pressed in the setting screen 400.

Subsequently, at S702, the CPU 203 checks the current connection status of the information processing apparatus 201 and stores information for achieving the connection status. Conceivable examples of the connection status of the information processing apparatus 201 include a status in which the information processing apparatus 201 is connected to an external access point and a status in which the information processing apparatus 201 is connected to a mobile communication network. When the information processing apparatus 201 is connected to an external access point, the communication apparatus 251 may be set in the infra communication mode so as to communicate with the communication apparatus 251 using the Internet. In contrast, when the information processing apparatus 201 is connected to a mobile communication network without an external access point therearound, the information processing apparatus 201 may set the communication apparatus 251 in the direct communication mode so as to communicate with the communication apparatus 251 without an external access point. Therefore, when the communication apparatus 251 is set in the infra communication mode, the information processing apparatus 201 at S702 is connected to the router 101. When the communication apparatus 251 is set in the direct communication mode, the information processing apparatus 201 is connected to the mobile communication network. When the information processing apparatus 201 is currently connected to the router 101, the CPU 203 at S702 stores the SSID of the router 101, a password for connection, and other information in a memory, such as the RAM 205. When the information processing apparatus 201 is currently connected to a mobile communication network, the CPU 203 stores setting information for connecting to the mobile communication network in a memory, such as the RAM 205.

Subsequently, at S703, the CPU 203 determines a communication mode to be set on the communication apparatus 251. Specifically, the CPU 203 determines a communication mode to be set on the communication apparatus 251 by distinguishing the type of a button pressed at S701. If the infra communication mode is set on the communication apparatus 251, the CPU 203 executes the process at S704. In contrast, if the direct communication mode is set on the communication apparatus 251, the CPU 203 executes the process at S709.

Figure 8:
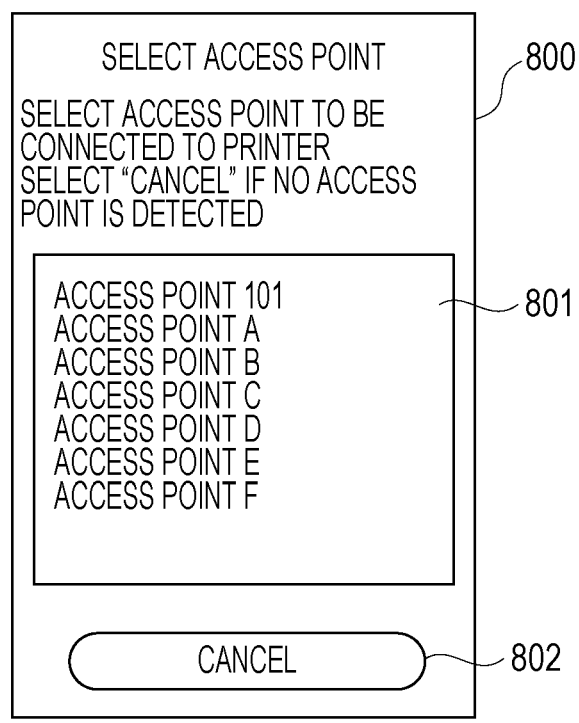
FIG. 8 is a diagram of an example of an access-point selection screen according to an embodiment of the present invention.
Figure 9:
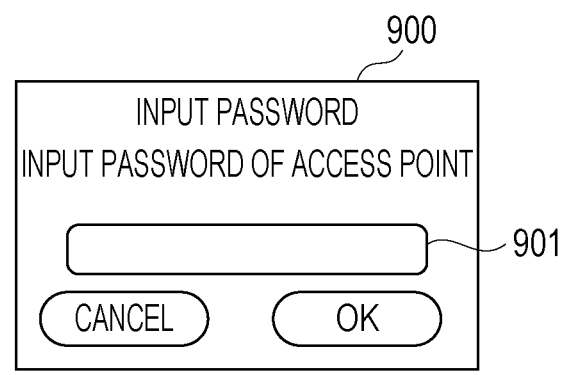
FIG. 9 is a diagram of an example of a password input screen according to an embodiment of the present invention.

At S704, the CPU 203 performs a process for setting the infra communication mode on the communication apparatus 251. Specifically, first, the CPU 203 receives a beacon packet that the communication apparatus 251 is broadcasting via the network interface 211 to acquire a communication apparatus SSID as information in the packet. Then, the CPU 203 sets the communication apparatus SSID as the SSID of the destination of the information processing apparatus 201 to connect the information processing apparatus 201 and the communication apparatus 251 together in peer-to-peer fashion. Next, the CPU 203 acquires information regarding an SSID corresponding to an external access point to which the communication apparatus 251 can connect from the communication apparatus 251. The CPU 203 displays an access-point selection screen 800, as shown in FIG. 8, to prompt the user to select an external access point for use in the infra communication mode. In this embodiment, the router 101 is selected by the user. Subsequently, the CPU 203 transmits SSID information corresponding to the router 101 and a command for setting the infra communication mode to the communication apparatus 251 by connection established using the communication apparatus SSID. If a password is necessary for using the router 101, the CPU 203 may display a password input screen 900, as shown in FIG. 9, and may transmit password information input to an entry portion 901 to the communication apparatus 251.

Upon receiving the SSID corresponding to the router 101 and the command for setting the infra communication mode, the communication apparatus 251 releases the connection setting mode. The communication apparatus 251 disables an access point corresponding to the communication apparatus SSID to temporarily release the connection to the information processing apparatus 201. Subsequently, the communication apparatus 251 sets the infra communication mode on the communication apparatus 251 itself on the basis of the command for setting the infra communication mode. Furthermore, the communication apparatus 251 connects to the router 101 on the basis of the SSID information received from the information processing apparatus 201. In this embodiment, the CPU 203 sets the infra communication mode on the communication apparatus 251 by executing the above process.

Subsequently, at S705, the CPU 203 returns the connection status of the information processing apparatus 201 to the status before the setting of the communication mode on the basis of the information stored at S702. Here, the information processing apparatus 201 is reconnected to the router 101. If the status before the setting of the communication mode is a status in which the information processing apparatus 201 is connected to a mobile communication network, the connection to the mobile communication network is restarted, and therefore the information processing apparatus 201 is not connected to an external access point. Therefore, if the status before the setting of the communication mode is a status in which the information processing apparatus 201 is connected to a mobile communication network, the information processing apparatus 201 may wait for a user instruction to connect to an external access point after the process at S703. In this case, after the information processing apparatus 201 connects to an external access point to which the communication apparatus 251 connects according a user instruction, the process at S706 is executed.

Subsequently, at S706, the CPU 203 displays a list of communication apparatuses connected to the router 101 on the display unit 208. Specifically, the CPU 203 issues a broadcast that requests a response to the communication apparatuses connected to the router 101. The CPU 203 waits for a response to the broadcast for a fixed time and displays a list of communication apparatuses that respond to the request. The responses from the communication apparatuses contain the names and MAC addresses of the communication apparatuses, and the list contains the names and MAC addresses. Since the communication apparatus 251 is connected to the router 101 by the process at S704, the list displayed at S706 contains the communication apparatus 251. The CPU 203 selects a communication apparatus to be connected by the infra connection from among the communication apparatuses displayed on the list. In this embodiment, assume that the communication apparatus 251 is selected.

Subsequently, at S707, the CPU 203 acquires functional information regarding a printer from the communication apparatus 251. The functional information is information indicating the functions of the printer. Specifically, the functional information is information regarding whether the communication apparatus 251 has a print function and a scanning function, whether a double-side printing and color/monochrome printing are supported, the kind and size of printing media, and data formats available in the functions of the communication apparatus 251. At S707, the CPU 203 transmits a command for requesting functional information to the communication apparatus 251 and receives functional information as a response thereto.

Subsequently, at S708, the CPU 203 registers the communication apparatus 251 as a communication apparatus with which the information processing apparatus 201 performs data communication. Specifically, the CPU 203 stores identification information regarding the communication apparatus 251, such as a MAC address, in a memory, such as the RAM 205 and an external HDD (not shown) in association with functional information acquired at S707 and information indicating that the infra communication mode is set on the communication apparatus 251. When a communication apparatus is registered, the name and identification information regarding the communication apparatus registered on a printer selection button 304 are displayed. Subsequently, the CPU 203 terminates the process.

At S709, the CPU 203 performs a process for setting the direct communication mode on the communication apparatus 251. Specifically, first, the CPU 203 connects the information processing apparatus 201 and the communication apparatus 251 together in peer-to-peer fashion by setting a communication apparatus SSID acquired as at S704 as the destination SSID of the information processing apparatus 201. Next, the CPU 203 acquires information, such as a direct connection SSID and a password for using direct connection with the communication apparatus 251, as direct connection information from the communication apparatus 251. Here, the direct connection SSID is an SSID corresponding to the access point in the communication apparatus 251 and is used to establish a direct connection with the information processing apparatus 201. The access point corresponding to the direct connection SSID and the access point corresponding to the communication apparatus SSID may be the same. Subsequently, the CPU 203 transmits a command for setting the direct communication mode to the communication apparatus 251. Upon receiving the command, the communication apparatus 251 releases the connection setting mode to disable the access point corresponding to the communication apparatus SSID to temporarily release the connection to the information processing apparatus 201. Subsequently, the communication apparatus 251 sets the direct communication mode on the communication apparatus 251 to enable the access point corresponding to the direct connection SSID. This embodiment sets the direct communication mode on the communication apparatus 251 by executing the above process.

Subsequently, at S710, the CPU 203 stores the direct connection information acquired at S709 in a memory, such as the RAM 205 and an external HDD (not shown). At that time, the CPU 203 stores the direct connection information without volatilization to thereby hold the information without volatilization even if the power of the information processing apparatus 201 is turned off. The stored direct connection information is referred to by the CPU 203 every time the information processing apparatus 201 attempts to directly connect to the communication apparatus 251. This configuration allows the information processing apparatus 201 to directly connect to the communication apparatus 251 without acquiring direct connection information or receiving user input for connection every time direct connection is to be established.

Subsequently, at S711, the CPU 203 directly connects to the communication apparatus 251. The connection between the communication apparatus 251 and the information processing apparatus 201 has been released at S709 because the access point corresponding to the communication apparatus SSID is disabled. Therefore, the CPU 203 directly connects the communication apparatus 251 to the information processing apparatus 201 by setting the direct connection SSID, which is information contained in the direct connection information stored at S710, as a destination SSID. At that time, if a password is required for the direct connection to the communication apparatus 251, the CPU 203 uses a password, which is information contained in the direct connection information stored at S710. Thus, the direct connection of the information processing apparatus 201 to the access point in the communication apparatus 251 allows the information processing apparatus 201 to again connect to the communication apparatus 251 using direction connection. In this manner, the use of the direct connection information stored at S710 allows the user to directly connect the information processing apparatus 201 to the communication apparatus 251 without a need for troublesome settings, such as selecting a direct connection SSID and inputting a password. In this embodiment, the direct connection information used is not cleared for storage. This configuration allows the stored direct connection information to be used again when direct connection is needed for processing in data communication, described later.

Subsequently, at S712, the CPU 203 acquires functional information regarding the printer from the communication apparatus 251. Specifically, the CPU 203 transmits a command to send functional information to the communication apparatus 251 and receives the functional information in response to the command.

Subsequently, at S713, the CPU 203 registers the communication apparatus 251 as a communication apparatus with which the information processing apparatus performs data communication. Specifically, the CPU 203 stores identification information regarding the communication apparatus 251, such as a MAC address, in a memory, such as the RAM 205, in association with the functional information acquired at S712 and information indicating that the direct communication mode is set on the communication apparatus 251. When the communication apparatus 251 is registered, the name of the registered communication apparatus 251 or identification information is displayed on the printer selection button 304. Subsequently, the CPU 203 terminates the process.

Subsequently, at S714, the CPU 203 releases the direct connection between the information processing apparatus 201 and the communication apparatus 251. At that time, the CPU 203 clears connection information that the OS stores to prevent the direct connection from being automatically restarted by an automatic connection function of the OS (a function of storing connection information regarding an access point to which the information processing apparatus 201 connected in the past and automatically connecting to the access point).

Subsequently, at S715, the CPU 203 restores the connection status of the information processing apparatus 201 to a status before the communication mode setting process on the basis of the information stored at S702. In this case, the information processing apparatus 201 is reconnected to the mobile communication network to which the information processing apparatus 201 was connected before. Subsequently, the CPU 203 terminates the process.

As described above, when the information processing apparatus 201 is connected to the communication apparatus 251 by direct connection, direct connection to the communication apparatus 251 is given precedence to connection to the Internet 102 via a mobile communication network. For this reason, when the information processing apparatus 201 is connected to the communication apparatus 251 by direct connection, the information processing apparatus 201 cannot use content on the Internet. For this reason, this embodiment sets the direct communication mode on the communication apparatus 251, stores information for directly connecting to the communication apparatus 251, and then temporarily releases the direct connection. This configuration allows the information processing apparatus of this embodiment to restore connection to the Internet after setting the direct communication mode on the communication apparatus 251.

In performing data communication between the information processing apparatus 201 and the communication apparatus 251, the user presses a photograph print button 301 or a content print button 302 on the startup screen 300, shown in FIG. 3, which is provided by the printing application. For example, data communication is executed after the user presses the printer set-up button 303, sets direct connection on the communication apparatus 251 on the setting screen 400 shown in FIG. 4, and presses the photograph print button 301 or the content print button 302. According to the process shown in FIG. 7, when the user sets direct connection, the direct connection is automatically released after the communication apparatus 251 is registered. Therefore, for example, even if the user gives an instruction to perform data communication after an interval from the setting of direct connection, the information processing apparatus 201 is capable of connecting to the Internet from the setting of direct connection to the start of the data communication. Thus, the process shown in FIG. 7 prevents connection of the information processing apparatus 201 to the Internet from being interrupted for a long time due to direct connection to the communication apparatus 251.

Next, data communication of the information processing apparatus 201 with the communication apparatus will be described in detail. Upon detecting a press of the photograph print button 301, the information processing apparatus 201 displays a screen (not shown), on the display unit 208, for printing a picture selected by the user from pictures stored in the external storage unit 206. On this screen, the user can cause a communication apparatus displayed on a printer selection button 304 to print an image. The printer selection button 304 shows a communication apparatus with which the information processing apparatus 201 performs data communication, which is registered at S708 or S713 in FIG. 7.

Figure 5:
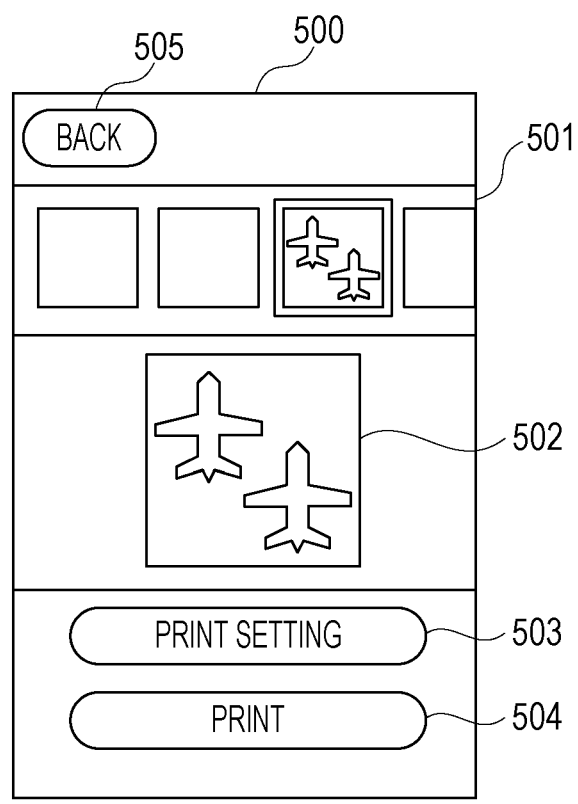
FIG. 5 is a diagram of an example of a content print screen according to an embodiment of the present invention.

Upon detecting a press of the content print button 302, the information processing apparatus 201 displays a content print screen 500, as shown in FIG. 5, on the display unit 208. By doing input on the content print screen 500, the user can cause an apparatus displayed on the printer selection button 304 to print content acquired via the Internet.

Figure 6:
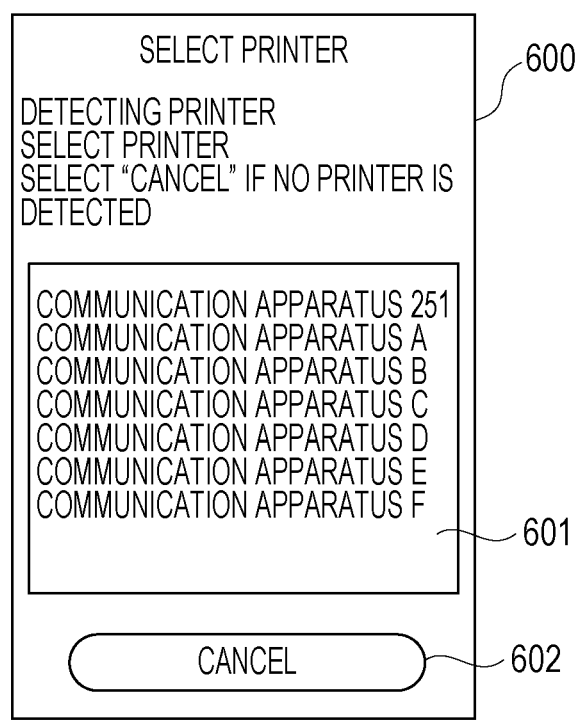
FIG. 6 is a diagram of an example of a printer detection screen according to an embodiment of the present invention.

Upon detecting a press of the printer selection button 304, the information processing apparatus 201 displays a printer detection screen 600, as shown in FIG. 6, on the display unit 208. The printer detection screen 600 displays communication apparatuses connected to the information processing apparatus 201 via the network interface 211 and capable of communicating with the information processing apparatus 201. The user can select an apparatus with which data communication is performed via the printer detection screen 600.

In this embodiment, the communication apparatus 251 is selected on the printer detection screen 600, and the information processing apparatus 201 performs settings and issues a print instruction to the communication apparatus 251. Upon detecting a press of an end button 305, the information processing apparatus 201 terminates the application.

Next, a process in the case where the information processing apparatus 201 acquires content on a Web server or the like via the Internet and causes the communication apparatus 251 to print the acquired content will be described with reference to FIG. 5. Printing content needs connection to the Internet. For this reason, the content print screen 500 in FIG. 5 is displayed and available under a situation in which the information processing apparatus 201 can use the Internet, such as when the information processing apparatus 201 is connected by infra connection or connected to a mobile communication network.

Upon detecting a press of the content print button 302, the information processing apparatus 201 displays the content print screen 500 on the display unit 208.

When the infra communication mode is set on the communication apparatus 251 at that time, the information processing apparatus 201 can access to content on a Web server provided that an external access point used for infra connection is connects to the Internet. In contrast, the communication apparatus 251 can be in the direct communication mode. Also in this case, the information processing apparatus 201 of this embodiment can access to content on a Web server because direct connection with the communication apparatus 251 is released after the communication mode is set.

A list display area 501 lists contents that are available via the Internet, from which the user can select content to be printed. Upon detecting selection of content displayed in the list display area 501, the information processing apparatus 201 displays detail information regarding the selected content in a preview area 502. For the preview of content, not all data constituting the content is needed; only minimum information for displaying a thumbnail view may be acquired. Upon detecting a press of a print setting button 503, the information processing apparatus 201 displays a print setting screen (not shown) for performing various print settings of a destination apparatus (in this case, the communication apparatus 251). The user can select desired print settings by doing input on the print setting screen. The details of various print settings on the print setting screen are determined on the basis of the functional information acquired at S707 in FIG. 7.

Upon detecting a press of a print button 504, the information processing apparatus 201 executes a process for printing the content selected by the user using the communication apparatus 251. Specifically, the information processing apparatus 201 first acquires image data and so on constituting the content selected by the user via the Internet 102. If the information processing apparatus 201 is not connected to the communication apparatus 251, the information processing apparatus 201 executes a process for connecting to the communication apparatus 251 and then transmits the acquired data, print setting information, and so on as a print job to the communication apparatus 251.

Figure 10:
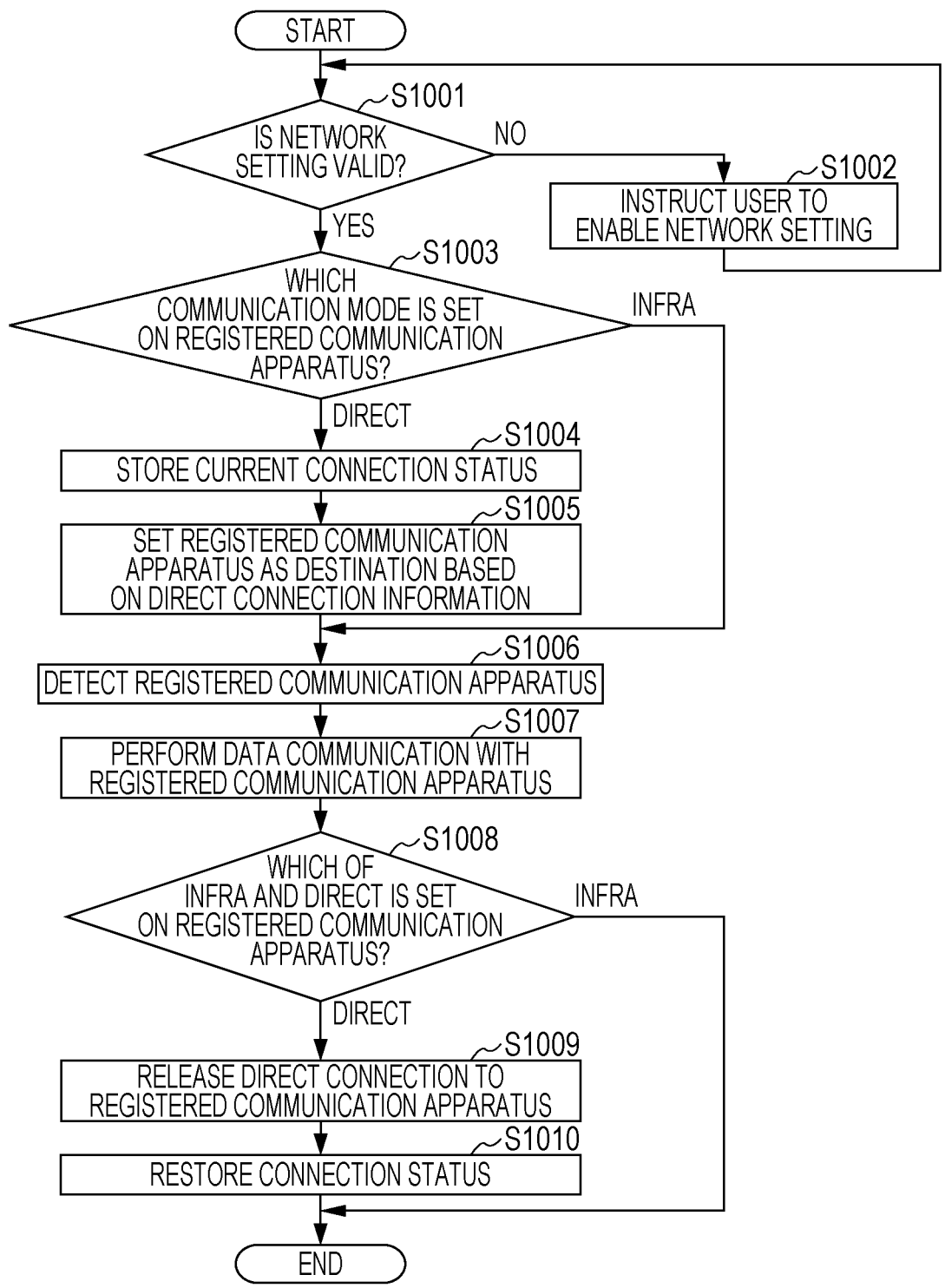
FIG. 10 is a flowchart illustrating a process that the information processing apparatus executes when starting data communication according to an embodiment of the present invention.

FIG. 10 is a flowchart illustrating a process that the information processing apparatus 201 of this embodiment executes when starting data communication. The process shown in the flowchart is implemented by the CPU 203 loading a control program stored in the ROM 204 or the HDD (not shown) of the information processing apparatus 201 into the RAM 205 and executing the control program. The process illustrated in the flowchart is started from a state where the process shown in FIG. 7 ends in which the communication apparatus 251 is registered as a communication apparatus for data communication. The process illustrated in the flowchart is started after it is determined by pressing the photograph print button 301 and the content print button 302 that data communication is to be performed between the information processing apparatus 201 and the communication apparatus 251.

First, at S1001, the CPU 203 determines whether the network setting of the information processing apparatus 201 is valid. One example of the network setting is Wi-Fi communication. Enabling the network setting of the information processing apparatus 201 enables the information processing apparatus 201 to execute the infra connection and the direct connection. If the CPU 203 determines that the network setting of the information processing apparatus 201 is valid, the CPU 203 executes the process at S1003, and if the CPU 203 determines that the network setting of the information processing apparatus 201 is not valid (is invalid), the CPU 203 executes the process at S1002.

At S1002, the CPU 203 displays a screen for instructing the user to enable the network setting of the information processing apparatus 201 on the display unit 208. At that time, the CPU 203 may enable the network setting of the information processing apparatus 201 without notifying the user of it. When the information processing apparatus 201 detects an access point connected before in a communicable range using connection information stored in the OS, the information processing apparatus 201 automatically reconnects to the access point using the connection information. Therefore, when the information processing apparatus 201 was connected to the communication apparatus 251 before by infra connection, the information processing apparatus 201 again connects to the communication apparatus 251 by infra connection. At S714, this embodiment releases direct connection, at which the CPU 203 deletes a history stored in the OS, and therefore the direct connection between the information processing apparatus 201 and the communication apparatus 251 is not restarted at this point of time. Subsequently, the CPU 203 executes the process at S1001 again.

At S1003, the CPU 203 determines which communication mode is set on the registered communication apparatus (the communication apparatus 251). At that time, the CPU 203 refers to information stored when the communication apparatus 251 is registered as a communication apparatus for data communication (S708 or S713). If the CPU 203 determines that the communication apparatus 251 is set to the infra communication mode, the CPU 203 executes the process at S1006, and if the CPU 203 determines that the communication apparatus 251 is set to the direct communication mode, the CPU 203 executes the process at S1004.

Subsequently, at S1004, the CPU 203 checks the current connection status of the information processing apparatus 201 and stores information for achieving the connection status. Since the user sets the direct communication mode on the communication apparatus 251 because there is no external access point around the information processing apparatus 201, the information processing apparatus 201 is connected to a mobile communication network at that time. Therefore, at S1004, the CPU 203 stores setting information and so on for connecting to the mobile communication network.

At S1005, the CPU 203 sets a direct connection SSID as the destination SSID of the information processing apparatus 201 on the basis of the direct connection information stored at S710. At that time, if a password is needed to connect to the communication apparatus 251, the CPU 203 uses a password to connect the communication apparatus 251 and the information processing apparatus 201 together on the basis of the direct connection information stored at S710 during setting of the communication mode. Subsequently, the CPU 203 executes the process at S1006.

At S1006, the CPU 203 detects the registered communication apparatus (the communication apparatus 251). Specifically, the CPU 203 issues a broadcast requesting a response to the connection network to which the information processing apparatus 201 connects. Subsequently, the CPU 203 receives a response from a communication apparatus to which the information processing apparatus 201 is directly connected or a communication apparatus connected to an access point to which the information processing apparatus 201 connects. The CPU 203 compares identification information contained in the response and the identification information, such as an MAC address, stored at the registration of the communication apparatus 251 to detect the communication apparatus 251.

Subsequently, at S1007, the CPU 203 executes data communication with the registered communication apparatus (the communication apparatus 251). Specifically, the CPU 203 transmits a command for a print job or for setting of the communication apparatus 251 to the communication apparatus 251 and receives information for displaying the processing status of the print job and the status of the communication apparatus 251 on the display unit 208 from the communication apparatus 251.

Subsequently, at S1008, the CPU 203 determines which of communication modes is set on the registered communication apparatus (the communication apparatus 251). At that time, the CPU 203 refers to the information stored when the communication apparatus 251 is registered. If the communication apparatus 251 is set to the infra communication mode, the CPU 203 terminates the process. This is because, when the communication apparatus 251 is set to the infra communication mode, the information processing apparatus 201 can communicate with both of the Internet and the communication apparatus 251, which eliminates the need for a process for switching communication lines, such as disconnecting the communication apparatus 251. In contrast, if the communication apparatus 251 is set to the direct communication mode, the CPU 203 executes the process at S1009.

At S1009, the CPU 203 releases the direct connection between the information processing apparatus 201 and the communication apparatus 251. At that time, the CPU 203 clears the connection information that the OS stores to prevent the direct connection from being automatically restarted by the automatic connection function of the OS (a function of storing connection information regarding an access point to which the information processing apparatus 201 connected in the past and automatically connecting to the access point). The connection information stored at S710 is stored in another area different from that for the connection information that the OS stores. For this reason, the connection information stored at S710 is not cleared at S1009.

Subsequently, at S1010, the CPU 203 returns the connection status of the information processing apparatus 201 to a status before the data communication process is executed on the basis of the information stored at S1004. Here, the information processing apparatus 201 is again connected to the mobile communication network. Subsequently, the CPU 203 terminates the process.

In this manner, at the start of data communication, the information processing apparatus of this embodiment executes direct connection using direct connection information acquired in advance and, at the end of the data communication, releases the direct connection. This configuration allows the information processing apparatus of this embodiment to connect to the Internet after direct connection is released and to restart the direct connection without operations, such as acquiring direct connection information and inputting a password. This improves user convenience. Furthermore, the information processing apparatus of this embodiment automatically acquires direct connection information from the communication apparatus and stores it during execution of a communication mode setting process, which is absolutely necessary for communication with the communication apparatus, to repeatedly use the connection information for direct connection. This configuration allows the information processing apparatus of this embodiment to acquire direct connection information without receiving a particular user instruction for acquiring direct connection information. This eliminates the need for troublesome user operations for setting direct connection, improving user convenience.

Furthermore, after completion of data communication by direct connection, the CPU 203 releases the direct connection between the information processing apparatus 201 and the communication apparatus 251. This configuration allows the CPU 203 to restore the connection between the information processing apparatus 201 and the Internet to access to content on a Web server, for example, when the content print screen 500 is to be used again.

Second Embodiment

The first embodiment shows an example of an information processing apparatus that can restart connection to the Internet by releasing direct connection when data communication ends.

For example, when print data is transmitted via the content print screen 500, shown in FIG. 5, the content print screen 500 is displayed also after completion of the transmission. When user selection is received again, the information processing apparatus 201 needs to connect to the Internet to acquire image data constituting content. Therefore, when print data is to be transmitted via the content print screen 500, the information processing apparatus 201 may release direct connection after the transmission ends and restart connection to the Internet.

For example, data stored in the information processing apparatus 201 is transmitted via a screen that displays a list of data stored in the information processing apparatus 201. This screen is kept displayed after the end of the transmission. When user selection is received at that time, the information processing apparatus 201 only needs to refer to the data stored therein and does not need to connect to the Internet. For this reason, when print data is to be transmitted via a screen that displays a list of data stored in the information processing apparatus 201, the information processing apparatus 201 may not release the direction connection to keep the direct connection after completion of the transmission.

This embodiment illustrates an example of an information processing apparatus capable of switching direct connection between connection and disconnection according to the utilization situation when data communication ends.

Figure 11:
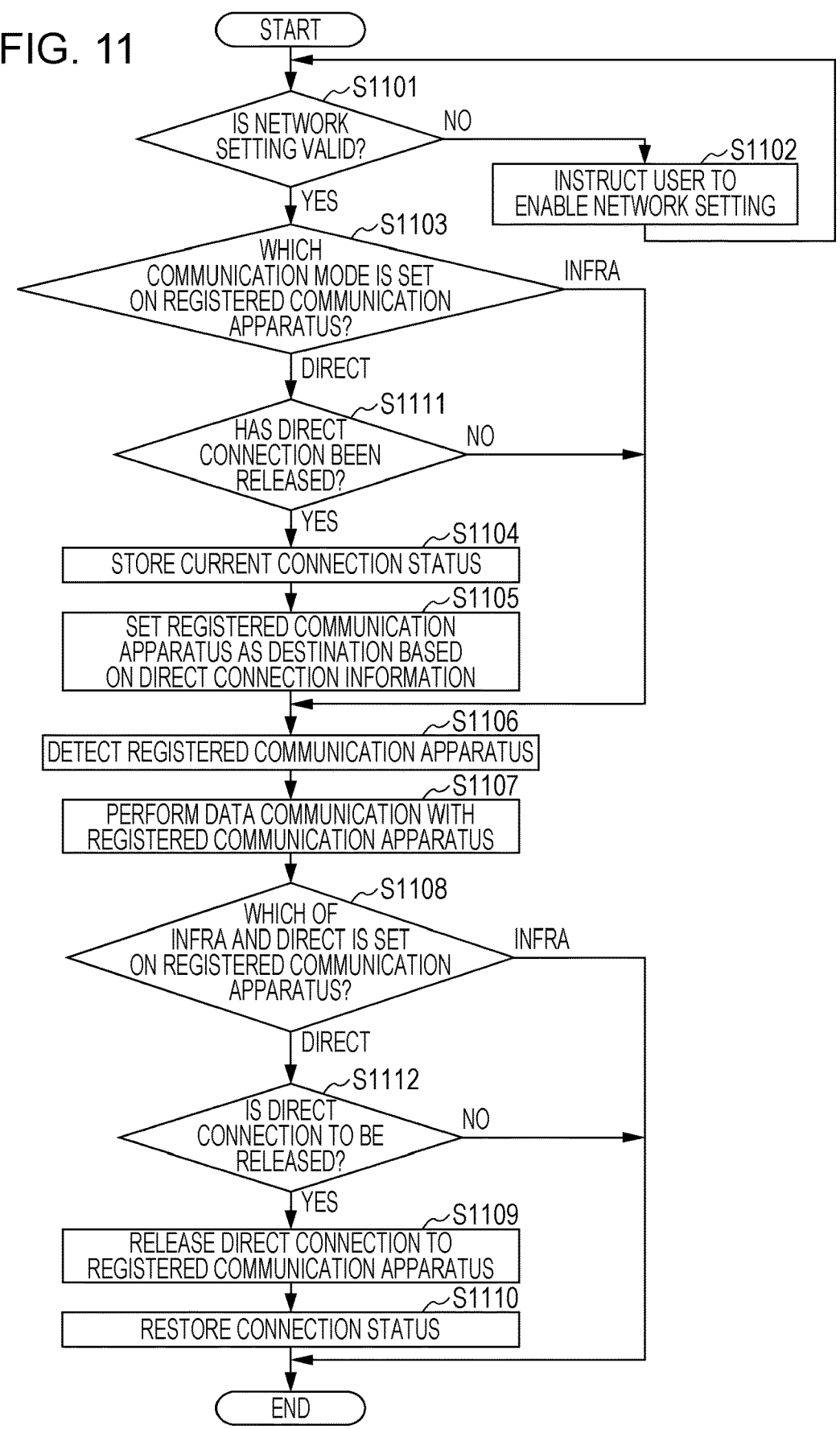
FIG. 11 is a flowchart illustrating a process that the information processing apparatus executes when starting data communication according to an embodiment of the present invention.

FIG. 11 is a flowchart illustrating a process that the information processing apparatus 201 of this embodiment executes when communicating with the communication apparatus 251. The process shown in the flowchart is implemented by the CPU 203 loading a control program stored in the ROM 204 or the HDD (not shown) of the information processing apparatus 201 into the RAM 205 and executing the control program. The process illustrated in the flowchart is started from a state where the process shown in FIG. 7 ends, in which the communication apparatus 251 is registered as a destination communication apparatus for data communication. The process illustrated in the flowchart is started after it is determined by pressing the photograph print button 301 or the content print button 302 that data communication is to be performed between the information processing apparatus 201 and the communication apparatus 251.

Descriptions of the processes from S1101 to S1110 will be omitted because they are the same as the processes from S1001 to S1010.

At S1111, the CPU 203 determines whether direct connection has been released. If it is determined that direct connection has been released, then the CPU 203 executes the process at S1104, and if not, the CPU 203 executes the process at S1106.

At S1112, the CPU 203 determines whether to release the direct connection. Specifically, the CPU 203 determines which of an input to a photograph printing screen or an input to a content printing screen is done for the data communication. For example, it is determined that data communication is executed by an input to a screen for content printing that uses the Internet, data acquisition and data communication via the Internet cannot be performed again if direct connection is kept. For this reason, the CPU 203 determines to release the direct connection and performs the process at S1109 to restart the connection between the information processing apparatus 201 and the Internet. If it is determined that data communication is executed by an input to a screen for photograph printing that does not use the Internet, the CPU 203 determines not to release the direct connection and terminates the process while keeping the direct connection.

This configuration allows the information processing apparatus of this embodiment to determine whether to release direct connection according to the utilization situation after data communication is performed. For example, when data communication is performed for content printing, direct connection is automatically released after the data communication is performed. Therefore, when the user again gives an instruction to perform content printing, the information processing apparatus 201 can appropriately connect to the Internet. On the other hand, when data communication is performed for photograph printing, the direct connection is kept even after the data communication is performed. Therefore, when the user again gives an instruction to perform photograph printing, there is no need to perform direct connection again, thus allowing quick data communication.

When the CPU 203 performs data communication for photograph printing and then shifts to, for example, the screen shown in FIG. 3 or FIG. 5, or when an instruction to terminate the application is executed, the direct connection is automatically released. Thus, when the user executes data communication for photograph printing and then executes content printing, the direct connection has already been released when the content printing screen is displayed. This enables appropriate access to the Internet for content printing.

Other Embodiments

Although the above embodiments illustrate a configuration in which the direct communication mode and the infra communication mode can be set on the communication apparatus 251, only the direct communication mode may be set. In this case, the process of determining which communication mode is to be set, such as S703, S1003, S1008, S1103, and S1108, can be omitted. A third communication mode other than the direct communication mode and the infra communication mode may be set so that three or more communication modes can be set.

Although the above embodiments illustrate a configuration in which the direct communication mode and the infra communication mode can be set on the communication apparatus 251, a communication mode set on the communication apparatus 251 is not limited to the above communication modes. In other words, any other communication modes in which apparatuses communicate with each other using some connecting configuration may be set on the communication apparatus 251. For example, a communication mode for communicating with a single apparatus via Wi-Fi Direct® and a communication mode for communicating with a plurality of apparatuses via Wi-Fi Direct® may be set on the communication apparatus 251. In any cases, the advantageous effects of aspects of the present invention can be given using a configuration in which communication lines are switched when the communication apparatus 251 is set in a communication mode for establishing communication using a connection configuration in which connection to the Internet cannot be established.

Although the above embodiments illustrate a process for executing the printing function, shown in FIG. 10, as an example of a process for data communication with the communication apparatus 251, this is not intended to limit aspects of the present invention. The process of switching communication lines, which is a feature of an aspect of the present invention, may be executed every time data communication is performed between apparatuses. Therefore, aspects of the present invention can also be applied to processes for executing a function of scanning a document placed on the communication apparatus 251, a function of performing other settings on the communication apparatus 251, and a function of acquiring the status of the communication apparatus 251.

The order of the processes of the flowcharts of the above embodiments may be changed, not all of the processes may be executed, or the details of the processes may be changed provided that the advantageous effects of the above embodiments are given.

The above embodiments can also be achieved by a process of supplying a program for implementing one or more of the functions of the above embodiments to a system or apparatus, and executing the program using one or more processors of the system or apparatus. The above embodiments can also be achieved using a circuit that achieves one or more functions (for example, an ASIC).

The embodiments of the present invention enable connection to a communication apparatus without troublesome user operations.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. An information processing apparatus configured to communicate with a communication apparatus, the information processing apparatus comprising:
   at least one processor, the at least one processor controlling a first connecting unit configured to establish a first connection that is a direct connection between the communication apparatus and the information processing apparatus;
   a connection-information acquisition unit configured to acquire, via the first connection, connection information for establishing a second connection that is a direct connection between the communication apparatus and the information processing apparatus, the second connection being different from the first connection;
a storage unit configured to store the acquired connection information in a memory;
a receiving unit configured to receive a transmission instruction to transmit data from a user at a timing after the first connection is established and before the second connection for transmitting predetermined data is established;
a second connecting unit configured to establish, based on receipt of the transmission instruction, the second connection for transmitting the predetermined data using the stored connection information; and
a transmitting unit configured to transmit the predetermined data to the communication apparatus via the second connection; and
a releasing unit configured to release the second connection based on ending of transmission of the predetermined data based on the transmission instruction,
wherein, based on receipt of the transmission instruction a third connection between a mobile communication network capable of communicating with the Internet and the information processing apparatus is released, and the predetermined data is transmitted to the communication apparatus via the second connection, and
wherein in a case where transmission of the predetermined data based on the transmission instruction is ended, the third connection is established.

2. The information processing apparatus according to claim 1, wherein the second connection is a connection between the communication apparatus and the information processing apparatus using an internal access point of the communication apparatus.

3. The information processing apparatus according to claim 2, wherein the at least one processor further controls a transmission unit configured to transmit setting information for enabling the internal access point to the communication apparatus via the first connection.

4. The information processing apparatus according to claim 1,
wherein the at least one processor further controls:
a third connecting unit configured to establish the second connection for acquiring functional information regarding the communication apparatus using the stored connection information;
a functional-information acquisition unit configured to acquire the functional information from the communication apparatus via the second connection; and
a second releasing unit configured to release the second connection after acquiring the functional information,
wherein the transmission instruction is received at a timing after the second connection for acquiring the functional information is released and before the second connection for transmitting predetermined data is established, and
wherein the functional information is at least one of information regarding whether the communication apparatus has a print function, information regarding whether the communication apparatus has a scanning function, information regarding whether double-side printing is supported, and information regarding whether color/monochrome printing is supported, information regarding a kind and size of a printing medium, or information regarding data formats available in functions of the communication apparatus.

5. The information processing apparatus according to claim 1, wherein the at least one processor further controls a transmission unit configured to transmit, via the first connection, connection setting information for connecting the communication apparatus to an external access point existing outside of the information processing apparatus and the communication apparatus.

6. The information processing apparatus according to claim 1,
wherein in a case where the transmission instruction is received while the information processing apparatus and the communication apparatus connect to an external access point existing outside of the information processing apparatus and the communication apparatus, the predetermined data is transmitted to the communication apparatus via the external access point, and
wherein in a case where the transmission instruction is received while the information processing apparatus and the communication apparatus do not connect to an external access point existing outside of the information processing apparatus and the communication apparatus, the predetermined data is transmitted to the communication apparatus via the second connection.

7. The information processing apparatus according to claim 6,
wherein in a case where transmission of the predetermined data via the external access point is ended, a connection between the information processing apparatus and the external access point is not released, and
wherein in a case where transmission of the predetermined data via the second connection is ended, the second connection is released.

8. The information processing apparatus according to claim 1, wherein the predetermined data that is transmitted based on the transmission instruction is data for causing the communication apparatus to execute printing.

9. The information processing apparatus according to claim 1,
wherein the at least one processor controls a display unit configured to display a screen for acquiring data from the Internet by the mobile communication network, and
wherein data that is transmitted based on the transmission instruction includes the data acquired from the Internet via the screen.

10. The information processing apparatus according to claim 9, wherein the data is acquired from the Internet via the screen at a timing after the first connection is established and before the second connection for transmitting the predetermined data is established.

11. The information processing apparatus according to claim 1, wherein a connection between the communication apparatus and the information processing apparatus is a connection using Wi-Fi®.

12. The information processing apparatus according to claim 1, wherein a connection between the communication apparatus and the information processing apparatus is a connection using Bluetooth®.

13. The information processing apparatus according to claim 1, wherein the transmission instruction is pressing of a predetermined button displayed by the information processing apparatus.

14. A control method of an information processing apparatus configured to communicate with a communication apparatus, the control method comprising:
causing the information processing apparatus to establish a first connection that is direct connection between the communication apparatus and the information processing apparatus;

acquiring, via the first connection, connection information for establishing a second connection that is direct connection between the communication apparatus and the information processing apparatus, the second connection being different from the first connection;
storing the acquired connection information in a memory;
receiving a transmission instruction to transmit data from a user at a timing after the first connection is established and before the second connection for transmitting predetermined data is established;
causing the information processing apparatus to establish, based on receipt of the transmission instruction, the second connection for transmitting the predetermined data using the stored connection information;
transmitting the predetermined data to the communication apparatus via the second connection; and
releasing the second connection based on ending of transmission of the predetermined data based on the transmission instruction,
wherein, based on receipt of the transmission instruction a third connection between a mobile communication network capable of communicating with the Internet and the information processing apparatus is released, and the predetermined data is transmitted to the communication apparatus via the second connection, and
wherein in a case where the transmission of the predetermined data based on the transmission instruction is ended, the third connection is established.

15. The control method according to claim 14, wherein the second connection is a connection between the communication apparatus and the information processing apparatus using an internal access point of the communication apparatus.

16. The control method according to claim 15, further comprising transmitting setting information for enabling the internal access point to the communication apparatus via the first connection.

17. The control method according to claim 14, further comprising
causing the information processing apparatus to establish the second connection for acquiring functional information regarding the communication apparatus using the stored connection information;
acquiring the functional information from the communication apparatus via the second connection; and
releasing the second connection after acquiring the functional information,
wherein the transmission instruction is received at a timing after the second connection for acquiring the functional information is released and before the second connection for transmitting predetermined data is established, and
wherein the functional information is at least one of information regarding whether the communication apparatus has a print function, information regarding whether the communication apparatus has a scanning function, information regarding whether double-side printing is supported, and information regarding whether color/monochrome printing is supported, information regarding a kind and size of a printing medium, or information regarding data formats available in functions of the communication apparatus.

18. The control method according to claim 14, further comprising transmitting, via the first connection, connection setting information for connecting the communication apparatus to an external access point existing outside of the information processing apparatus and the communication apparatus.

19. The control method according to claim 14, wherein in a case where the transmission instruction is received while the information processing apparatus and the communication apparatus connect to an external access point existing outside of the information processing apparatus and the communication apparatus, the predetermined data is transmitted to the communication apparatus via the external access point, and wherein in a case where the transmission instruction is received while the information processing apparatus and the communication apparatus do not connect to an external access point existing outside of the information processing apparatus and the communication apparatus, the predetermined data is transmitted to the communication apparatus via the second connection.

20. The control method according to claim 19,
wherein in a case where the transmission of the predetermined data via the external access point is ended, a connection between the information processing apparatus and the external access point is not released, and
wherein in a case where transmission of the predetermined data via the second connection is ended, the second connection is released.

21. The control method according to claim 14, wherein the predetermined data that is transmitted based on the transmission instruction is data for causing the communication apparatus to execute printing.

22. The control method according to claim 14, further comprising
displaying a screen for acquiring data from the Internet by the mobile communication network,
wherein the data that is transmitted based on the transmission instruction includes then data acquired from the Internet via the screen.

23. The control method according to claim 22, wherein the data is acquired from the Internet via the screen at a timing after the first connection is established and before the second connection for transmitting the predetermined data is established.

24. The control method according to claim 14, wherein a connection between the communication apparatus and the information processing apparatus is a connection using Wi-Fi®.

25. The control method according to claim 14, wherein a connection between the communication apparatus and the information processing apparatus is a connection using Bluetooth®.

26. The control method according to claim 14, wherein the transmission instruction is pressing of a predetermined button displayed by the information processing apparatus.

27. A control method of an information processing apparatus configured to communicate with a communication apparatus by a predetermined application program, the control method comprising:
causing the information processing apparatus to establish a first connection that is a direct connection between the communication apparatus and the information processing apparatus;
acquiring via the first connection, connection-information for establishing a second connection that is a direct connection between the communication apparatus and the information processing apparatus, the second connection being different from the first connection;
storing the acquired connection information in a memory;

receiving a transmission instruction to transmit data from a user at a timing after the first connection is established and before the second connection for transmitting predetermined data is established;

causing the information processing apparatus to establish, based on receipt of the transmission instruction, the second connection for transmitting the predetermined data using the stored connection information; and transmitting the predetermined data to the communication apparatus via the second connection, releasing the second connection based on ending of transmission of the predetermined data based on the transmission instruction;

wherein, based on receipt of the transmission instruction, communication by the predetermined application program via a third connection between a mobile communication network capable of communicating with the Internet and the information processing apparatus becomes inexecutable and the predetermined data is transmitted to the communication apparatus via the second connection, and wherein in a case where the second connection is released, the communication by the predetermined application program via the third connection becomes executable.

28. The control method according to claim 27, wherein the second connection is a connection between the communication apparatus and the information processing apparatus using an internet access point of the communication apparatus.

29. The control method according to claim 28, further comprising transmitting setting information for enabling the internal access point to the communication apparatus via the first connection.

30. The control method according to claim 27, further comprising:

causing the information processing apparatus to establish the second connection for acquiring funtional infomration regarding the communication apparatus using the stored connection information;

acquiring the functional information from the communication apparatus via the second connection; and releasing the second connection after acquiring the functional information, wherein the transmission instruction is received at a timing after the second connection for acquiring the functional information is released and before the second connection for transmitting the predetermined data is established, and wherein the functional information is at least one of information regarding whether the communication apparatus has a print function, information regarding whether the communication apparatus has a scanning function, information regarding whether double-side printing is supported, and information regarding whether color/monochrome printing is supported, information regarding a kind and size of a printing medium, or information regarding data formats available in functions of the communication apparatus.

31. The control method according to claim 27, further comprising transmitting, via the first connection, connection setting information for connecting the communication apparatus to an external access point existing outside of the information processing apparatus and the communication apparatus.

32. The control method according to claim 27, wherein in a case where the transmission instruction is received while the information processing apparatus and the communication apparatus connect to an external access point existing outside of the information processing apparatus and the communication apparatus, the predetermined data is transmitted to the communication apparatus via the external access point, and wherein in a case where the transmission instruction is received while the information processing apparatus and the communication apparatus do not connect to an external access point existing outside of the information processing apparatus and the communication apparatus, the predetermined data is transmitted to the communication apparatus via the second connection.

33. The control method according to claim 32, wherein in a case where the transmission of the predetermined data via the external access point is ended, a connection between the information processing apparatus and the external access point is not released, and wherein in a case where the transmission of the predetermined data via the second connection is ended, the second connection is released.

34. The control method according to claim 27, wherein the predetermined data that is transmitted based on the transmission instruction is data for causing the communication apparatus to execute printing.

35. The control method according to claim 27, further comprising:

displaying a screen for acquiring data from the Internet by the mobile communication network, wherein the data that is transmitted based on the transmission instruction includes the data acquired from the Internet via the screen.

36. The control method according to claim 35, wherein the data is acquired from the Internet via the screen at a timing after the first connection is established and before the second connection for transmitting the predetermined data is established.

37. The control method according to claim 27, wherein a connection between the communication apparatus and the information processing apparatus is a connection using Wi-Fi®.

38. The control method according to claim 27, wherein a connection between the communication apparatus and the information processing apparatus is a connection using Bluetooth®.

39. The control method according to claim 27, wherein the transmission instruction is pressing of a predetermined button displayed by the information processing apparatus.

40. A non-transitory computer readable storage medium storing a program for causing a computer to function as respective units of an information processing apparatus, the information processing apparatus comprising:

causing the information processing apparatus to establish a first connection that is a direct connection between the communication apparatus and the information processing apparatus;

acquiring via the first connection, connection-information for establishing a second connection that is a direct connection between the communication apparatus and the information processing apparatus, the second connection being different from the first connection;

storing the acquired connection information in a memory;

receiving a transmission instruction to transmit data from a user at a timing after the first connection is established and before the second connection for transmitting predetermined data is established;

causing the information processing apparatus to establish, based on receipt of the transmission instruction, the second connection for transmitting the predetermined data using the stored connection information; and transmitting the predetermined data to the communication apparatus via the second connection, releasing the second connection based on ending of transmission of the predetermined data based on the transmission instruction;

wherein, based on receipt of the transmission instruction, the second connection is established, communication by the predetermined application program via a third connection between a mobile communication network capable of communicating with the Internet and the information processing apparatus becomes inexecutable and the predetermined data is transmitted to the communication apparatus via the second connection, and wherein in a case where the second connection is released, the communication by the predetermined application program via the third connection becomes executable.

41. A non-transitory computer readable storage medium storing a program for causing a computer to function as respective units of an information processing apparatus, the information processing apparatus comprising:

causing the information processing apparatus to establish a first connection that is a direct connection between the communication apparatus and the information processing apparatus;

acquiring via the first connection, connection-information for establishing a second connection that is a direct connection between the communication apparatus and the information processing apparatus, the second connection being different from the first connection;

storing the acquired connection information in memory;

receiving a transmission instruction to transmit datat from a user at a timing after the first connection is established and before the second connection for transmitting predetermined data is established.

causing the information processing apparatus to establish, based on receipt of the transmission instruction, the second connection for transmitting the predetermined data using the second connection information; and transmitting the predetermined data to the communication apparatus via the second connection, releasing the second connection based on ending of transmission of the predetermined data based on the transmission instruction;

wherein, based on receipt of the transmission instruction, the second connection is established, communication by the predetermined application program via a third connection between a mobile communication network capable of communicating with the Internet and the information processing apparatus becomes inexecutable and the predetermined data is transmitted to the communication apparatus via the second connection, and wherein in a case where the second connection is released, the communication by the predetermined application program via the third connection becomes executable.

42. An information processing apparatus configured to communicate with a communication apparatus by a predetermined application program, the information processing apparatus comprising:

at least one processor, the at least one processor controlling a first causing unit configured to cause the information processing apparatus to establish a first connection that is a direct connection between the communication apparatus and the information processing apparatus;

an acquiring unit configured to acquire via the first connection, connection information for establishing a second connection that is a direct connection between the communication apparatus and the information processing apparatus, the second connection being different from the first connection;

a storing unit configured to store the acquired connection information in a memory;

a receiving unit configured to receive a transmission instruction to transmit data from a user at a timing after the first connection is established and before the second connection for transmitting predetermined data is established;

a second causing unit configured to cause the information processing apparatus to establish, based on receipt of the transmission instruction, the second connection for transmitting the predetermined data using the stored connection information;

a transmitting unit configured to transmit the predetermined data to the communication apparatus via the second connection, and a releasing unit configured to release the second connection based on ending of transmission of the predetermined data based on the transmission instruction;

wherein, based on receipt of the transmission instruction communication by the predetermined application program via a third connection between a mobile communication network capable of communicating with the Internet and the information processing apparatus becomes inexecutable and the predetermined data is transmitted to the communication apparatus via the second connection, and wherein in a case where the second connection is released, the communication by the predetermined application program via the third connection becomes executable.

* * * * *